Patented Feb. 17, 1931

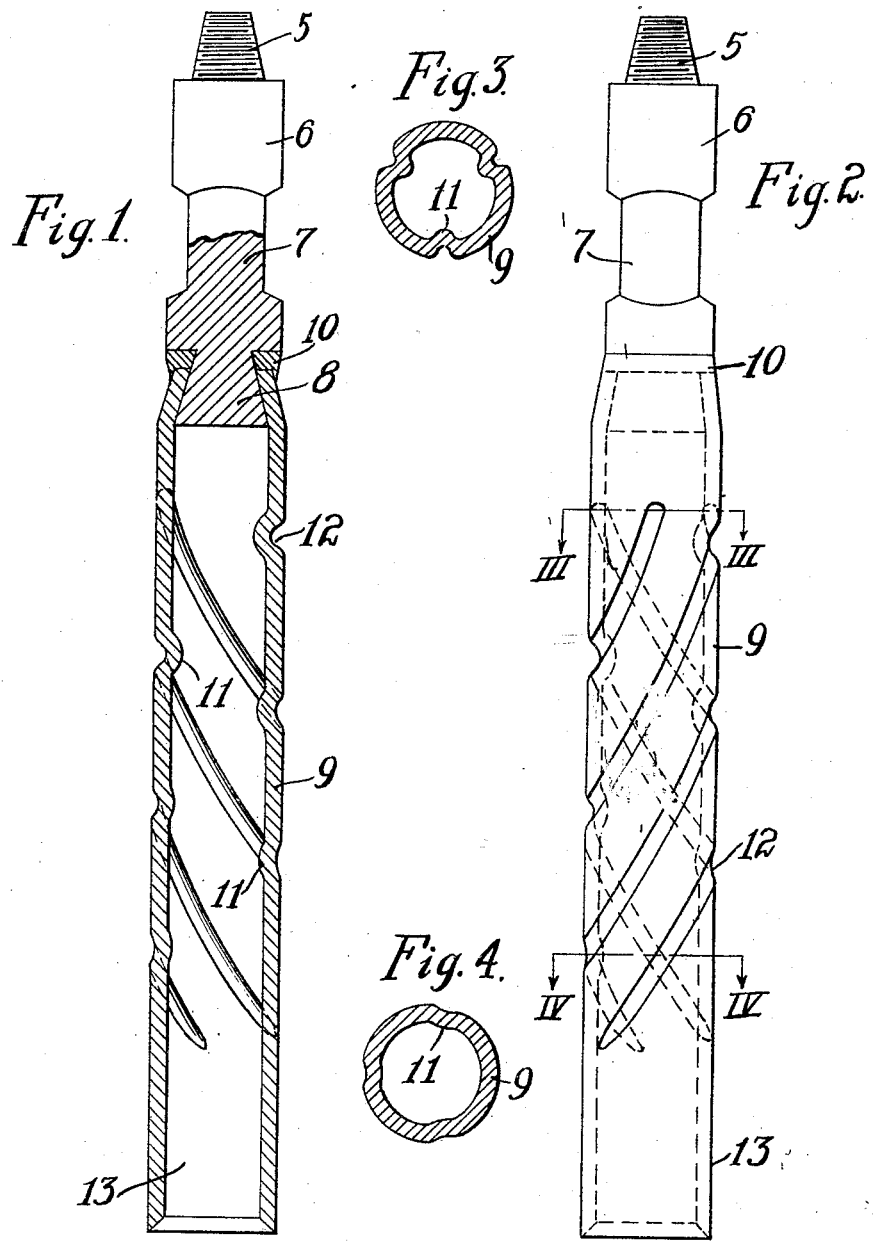

1,793,105

UNITED STATES PATENT OFFICE

ARTHUR E. LIDDERDALE, OF CASPER, WYOMING, ASSIGNOR TO SPANG AND COMPANY, OF BUTLER, PENNSYLVANIA, A CORPORATION OF PENNSYLVANIA

FISHING TOOL

Application filed July 29, 1929. Serial No. 382,055.

This invention relates to well tools and more particularly to fishing tools of the type known as friction sockets.

An object of this invention is to provide a fishing tool of this type having an improved construction and arrangement.

A further object is to provide an improved method of manufacturing fishing tools of the friction socket type.

These and other objects which will be apparent to those skilled in this particular art are attained by means of the invention illustrated in the accompanying drawing in which Fig. 1 is a transverse sectional view through a friction socket fishing tool constructed in accordance with one embodiment of this invention. Fig. 2 is a side elevation thereof, and Figs. 3 and 4 are transverse sections on the lines 3—3 and 4—4, respectively, of Fig. 2.

The particular embodiment of the present invention which has been chosen for the purposes of illustration contemplates the provision of a fishing tool of the friction socket type which can be manufactured from standard tubing and which, at the same time, has the inner surface thereof so formed as to produce a constantly increasing grip as the socket is forced down over the top of the lost article.

As illustrated, the tool is provided with a head having the usual threaded pin 5, collar 6, and wrench square 7, as is well known in this particular art. The bottom of the tool head below the wrench square, has a downwardly extending projection 8 of conical form. The body portion of the tool is formed by a tubular member 9 having the upper end thereof swaged inwardly or closed over the tapered cone shaped projection 8 and a weld 10 secures the tubular body portion to the tool head.

The inner surface of the tubular body portion is provided with article engaging and gripping surfaces of such form that an article received within the socket will be engaged by a grip of increasing force as the socket is forced downwardly over the article. As illustrated, the gripping surfaces are formed by projections 11 which begin at a point spaced from the lower end of the body portion and extend upwardly in a spiral direction, to a point adjacent the tool head. The projections are of tapered arrangement, that is to say, of an increasing protuberance from the bottom of the projections to the upper end thereof, as most clearly illustrated in Fig. 1.

In the manufacture of the present invention, ordinary tubing is provided with the article gripping projections by subjecting the outer surface thereof to the action of corrugating rolls which form indentations 12 in the outer face and simultaneously produce the projections 11 on the inside of the tube. One end of the latter is then swaged, spun, or otherwise closed over the tapered projection 8 of the tool head and the two component parts are welded or secured together in any other desired manner.

The lower end 13 of the socket is smooth for guiding the socket downwardly over the lost article. It is forced downwardly over the article until the spiral projections 11 engage the article with sufficient grip to permit its being lifted to the surface with the tool.

What I claim as new and desire to secure by Letters Patent is:

1. A friction socket having a tubular body portion and a tapered article engaging spiral projection extending upwardly on the inner surface thereof.

2. A friction socket having a tubular body portion and an article engaging projection extending spirally around the inner surface of said body portion and of increasing height from one end to the other.

3. A friction socket having a tubular body portion and a plurality of spiral projections extending upwardly on the inner face thereof adapted to engage and securely hold an article received therein.

4. A friction socket having a tubular body portion and a plurality of spiral projections extending upwardly on the inner face thereof adapted to engage and securely hold an article received therein, said projections tapering from a point near the bottom of said body portion to the top thereof.

5. A friction socket having a tubular body portion and an article engaging projection spirally arranged on the inner surface thereof, said projection being so formed that the friction between the article and the projection will increase as the article is forced further into said tubular portion.

6. A friction socket having a tubular body portion and a tapering spiral projection on the inner surface thereof adapted to engage an article received in said tubular portion, said projection being pressed from the walls of said body portion.

7. A friction socket comprising a head having a projection therebeneath and a tubular body secured to said projection and having spiral article engaging projections on the inner surface thereof of such form that an article received therein will be held by a grip of increasing force.

8. A friction socket comprising a head member having a downwardly extending projection of conical shape thereon and a tubular body having one end secured to said projection and having a tapered spiral article engaging projection on the inner surface so that an article received therein will be held by a grip of increasing force, said projection being pressed from the wall of said tubular body.

9. A friction socket comprising a head member having a downwardly extending projection of conical shape thereon, a tubular body having an end swedged over said conical projection and a tapered spiral article engaging projection formed on the inner surface of said tubular body, the taper of said projection increasing from the bottom to the top of said tubular body so that an article received therein will be held by a grip of increasing force.

In testimony whereof, I have hereunto subscribed my name this 22nd day of July, 1929.

ARTHUR E. LIDDERDALE.